(12) United States Patent
Han et al.

(10) Patent No.: US 11,622,625 B2
(45) Date of Patent: Apr. 11, 2023

(54) ANGLE BAR FOR SHELF ASSEMBLY

(71) Applicant: Speedrack Co., Ltd., Gimpo-si (KR)

(72) Inventors: Jae Koon Han, Gimpo-si (KR); Hyo Sang Yoon, Gimpo-si (KR); Yoon Ki Kim, Gimpo-si (KR); Jun Hyuk Lee, Seoul (KR)

(73) Assignee: SPEEDRACK CO., LTD., Gimpo-si (KR)

( * ) Notice: Subject to any disclaimer, the term of this patent is extended or adjusted under 35 U.S.C. 154(b) by 0 days.

(21) Appl. No.: 17/728,846

(22) Filed: Apr. 25, 2022

(65) Prior Publication Data

US 2022/0338621 A1 Oct. 27, 2022

(30) Foreign Application Priority Data

Apr. 26, 2021 (KR) .................. 10-2021-0053999
Jan. 12, 2022 (KR) .................. 10-2022-0004703

(51) Int. Cl.
*A47B 47/00* (2006.01)
*A47B 96/14* (2006.01)
*A47B 96/06* (2006.01)

(52) U.S. Cl.
CPC .......... *A47B 47/0041* (2013.01); *A47B 96/06* (2013.01); *A47B 96/1408* (2013.01); *A47B 2220/0036* (2013.01)

(58) Field of Classification Search
CPC ............. A47B 47/00; A47B 47/0041; A47B 96/1408; A47B 96/06; A47B 2220/0036; A47B 57/06; A47B 57/50; A47B 57/22
See application file for complete search history.

(56) References Cited

U.S. PATENT DOCUMENTS

| 2,992,744 | A | * | 7/1961 | Fohn | A47B 57/22 108/157.13 |
| 3,637,087 | A | * | 1/1972 | Denny | A47B 57/402 211/192 |
| 5,463,966 | A | * | 11/1995 | Nilsson | F16B 12/34 108/193 |
| 6,241,109 | B1 | * | 6/2001 | Kautz | A47B 57/50 403/329 |

(Continued)

FOREIGN PATENT DOCUMENTS

EP 0752223 A2 * 7/1996
KR 200228609 6/2001

(Continued)

*Primary Examiner* — Devin K Barnett
(74) *Attorney, Agent, or Firm* — Cantor Colburn LLP

(57) ABSTRACT

Provided is an angle bar for shelf assembly, the angle bar including a vertical frame in which a plurality of fastening grooves is formed and a horizontal frame on which a fastening protrusion is formed, wherein the plurality of fastening grooves, each including upper and lower grooves, are formed, the lower groove has a narrower width than the upper groove, and is connected to the upper groove with an inclination portion in between, wherein the fastening protrusion includes a convex portion having an inclination surface and first and second wing portions that are formed on lateral surfaces, respectively, of the convex portion, and wherein a distance between respective end portions of the first and second wing portions is smaller than a width of the upper groove and is larger than a width of the lower groove, and the convex portion has a wider width than the lower groove.

10 Claims, 9 Drawing Sheets

(56) References Cited

U.S. PATENT DOCUMENTS

| | | | | |
|---|---|---|---|---|
| 8,967,401 B2* | 3/2015 | Wu | A47B 47/0083 | 403/217 |
| 9,027,767 B2* | 5/2015 | Buckley | A47B 57/34 | 211/134 |
| 9,215,931 B1* | 12/2015 | Offerman | A47B 96/024 | |
| 9,301,610 B1* | 4/2016 | Berry | F16B 12/02 | |
| 9,375,102 B2* | 6/2016 | Troyner | A47F 5/01 | |
| 10,806,257 B1* | 10/2020 | Liu | A47B 47/024 | |
| 11,006,750 B2* | 5/2021 | Chiu | A47B 96/06 | |
| 11,019,921 B2* | 6/2021 | Liss | A47B 47/028 | |
| 11,026,509 B2* | 6/2021 | Walker | A47B 47/027 | |
| 11,039,686 B2* | 6/2021 | Min | A47B 47/0083 | |
| 11,344,114 B2* | 5/2022 | Li | A47B 47/028 | |
| D953,854 S* | 6/2022 | Yoon | D8/403 | |
| 2004/0177792 A1* | 9/2004 | Salmanson | A47B 57/22 | 108/55.1 |
| 2005/0103733 A1* | 5/2005 | Saltzberg | A47B 96/00 | 211/187 |
| 2005/0103734 A1* | 5/2005 | Saltzberg | A47B 57/50 | 211/187 |
| 2005/0235885 A1* | 10/2005 | Salmanson | A47B 57/22 | 108/55.1 |
| 2008/0272676 A1* | 11/2008 | Eustace | A47B 47/0083 | 312/243 |
| 2010/0084354 A1* | 4/2010 | Eustace | A47F 5/00 | 211/183 |
| 2012/0000873 A1* | 1/2012 | Fitzgerald | A47B 96/1441 | 211/153 |
| 2014/0034593 A1* | 2/2014 | Chen | A47B 57/50 | 211/208 |
| 2015/0090683 A1* | 4/2015 | Sabounjian | A47B 96/14 | 211/186 |
| 2015/0282613 A1* | 10/2015 | Chen | A47B 96/021 | 211/187 |
| 2015/0313357 A1* | 11/2015 | David | A47B 47/027 | 211/187 |
| 2019/0290000 A1* | 9/2019 | Davis | A47B 96/021 | |
| 2020/0163455 A1* | 5/2020 | Liss | A47B 47/021 | |
| 2020/0253374 A1* | 8/2020 | Lu | A47B 96/1408 | |

FOREIGN PATENT DOCUMENTS

| | | |
|---|---|---|
| KR | 200246071 | 11/2001 |
| KR | 101845802 | 4/2018 |
| KR | 2020200000067 | 1/2020 |
| KR | 20210021433 | 2/2021 |

* cited by examiner

ANGLE BAR FOR SHELF ASSEMBLY

BACKGROUND OF THE INVENTION

Field of the Invention

The present disclosure relates to an angle bar for shelf assembly and, more particularly, to an angle bar for shelf assembly that is capable of being used simply and conveniently for shelf assembling and remaining securely connected at a predetermined position after shelf assembling.

Description of the Related Art

The use of an angle bar for shelf assembly instead of timber for assembling a decoration cabinet, a storage closet, a showcase, and the like saves purchasing cost, facilitates secure assembling, and provides ease of disassembling for movement. Furthermore, the use of the angle bar for shelf assembly provides various advantages, such as adjusting a height of a shelf whenever needed.

Korean Utility Model No. 20-0228609 (titled "FRAME ANGLE BOARD CONSOLATION STRUCTURE") discloses a structure where a vertical angle bar and a horizontal angle bar are combined with each other using a bolt and a nut. This structure has the disadvantage of requiring a work tool, such as a screwdriver or a drill. A problem with the structure is that the outward protruding head of the bolt does not provide an ornamental appearance.

Korean Utility Model No. 20-0246071 (titled "ANGLE BAR FOR SHELF ASSEMBLY") discloses a structure where a rivet is inserted into a hooking groove for being fastened thereto. A problem with this structure is that small contact areas of the rivet and the hooking groove decreases the strength of the binding force.

Korean Patent No. 10-1845802 (titled "ASSEMBLY SHELF") discloses that a convex portion is forced to be inserted into a fastening groove. A problem with this structure is that, for forced insertion, the convex portion has to be hit by a hammer, thereby producing much nose.

The foregoing is intended merely to aid in the understanding of the background of the present disclosure, and is not intended to mean that the present disclosure falls within the purview of the related art that is already known to those skilled in the art.

Document of Related Art (Patent Document 1) Korean Utility Model No. 20-0228609 (titled "FRAME ANGLE BOARD CONSOLATION STRUCTURE")
(Patent Document 2) Korean Utility Model No. 20-0246071 (titled "PREFABRICATED ANGLE BAR")
(Patent Document 3) Korean Patent No. 10-1845802 (titled "ASSEMBLY SHELF")

SUMMARY OF THE INVENTION

An objective of the present disclosure is to provide an angle bar for shelf assembly that is capable of being used simply and conveniently for shelf assembling and remaining securely connected at a predetermined position after shelf assembling.

Another objective of the present disclosure is to provide an angle bar for shelf assembly capable of providing an improved ornamental appearance after being assembled.

Another objective of the present disclosure is to provide an angle bar for shelf assembly that causes less noise during shelf assembling.

According to an aspect of the present disclosure, there is provided an angle bar for shelf assembly, the angle bar including a vertical frame in which a plurality of fastening grooves is formed lengthwise and a horizontal frame on which a fastening protrusion to be inserted into the fastening groove is formed, wherein the plurality of fastening grooves, each including an upper groove and a lower groove, are sequentially formed lengthwise, the lower groove has a narrower width than the upper groove, and is connected to the upper groove with an inclination portion in between, wherein the fastening protrusion includes a convex portion having an inclination surface widthwise in the upward-downward direction and a first wing portion and a second wing portion that are formed on lateral surfaces, respectively, of the convex portion in such a manner as to protrude therefrom, and wherein a distance between an end portion of the first wing portion and an end portion of the second wing portion is smaller than a width in the leftward-rightward direction of the upper groove and is larger than a width in the leftward-right direction of the lower groove, and the convex portion has a wider width in the leftward-rightward direction than the lower groove in such a manner as to be forced to be inserted into the lower groove.

According to another aspect of the present disclosure, there is provided an angle bar for shelf assembly, the angle bar including a vertical frame in which a plurality of fastening grooves is formed lengthwise and a horizontal frame on which a fastening protrusion inserted into the fastening groove is formed, wherein the plurality of fastening grooves, each including an upper groove, a middle groove, and a lower groove, are sequentially formed lengthwise, the middle groove has a narrower width than the upper groove and is connected to the upper groove with an inclination portion in between, and the lower groove has a narrower width than the middle groove and is connected to the middle groove with the inclination in between, wherein the fastening protrusion includes a convex portion having an inclination surface widthwise in the upward-downward direction and a first wing portion and a second wing portion that are formed on lateral surfaces, respectively, of the convex portion in such a manner as to protrude therefrom, and wherein a distance between an end portion of the first wing portion and an end portion of the second wing portion is smaller than a width in the leftward-rightward direction of the upper groove and is larger than a width in the leftward-right direction of the lower groove, and the convex portion has a narrower width in the leftward-rightward direction than the middle groove and has the wider width than the lower groove in such a manner as to be forced to be inserted into the lower groove.

In the angle bar, a convex portion of the fastening protrusion may include an upper convex portion and a lower convex portion with an interface portion in between, and the upper convex portion may be inclined more steeply in the vicinity of the interface portion than the lower convex portion.

In the angle bar, the fastening protrusion may be inserted into the fastening groove for being fastened thereto, in such a manner that the interface portion reaches an end portion of the lower groove, and the lower convex portion may press against a rear surface of the vertical frame.

In the angle bar the interface portion may be formed on the convex portion in such a manner that the vertical frame is inserted between the wing portion and the interface portion.

In the angle bar for shelf assembly, the lower convex portion may be arc-shaped widthwise in the upward-downward direction.

With the configuration described above, the angle bar for shelf assembly does not require the use of a bolt and a nut in combining a horizontal angle bar and a vertical angle bar to each other, thereby making and simple and convenient shelf assembling possible. In addition, since the head of the bolt does not protrude, an ornamental appearance can be improved. In addition, the angle bar for shelf assembly according to the present disclosure does not wobble easily because the strength of the binding force is increased between the horizontal angle bar (or a horizontal frame) and the vertical angle bar (or a horizontal frame). In addition, since the ease of assembling removes the need of hammering, less noise can be produced during shelf assembling.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
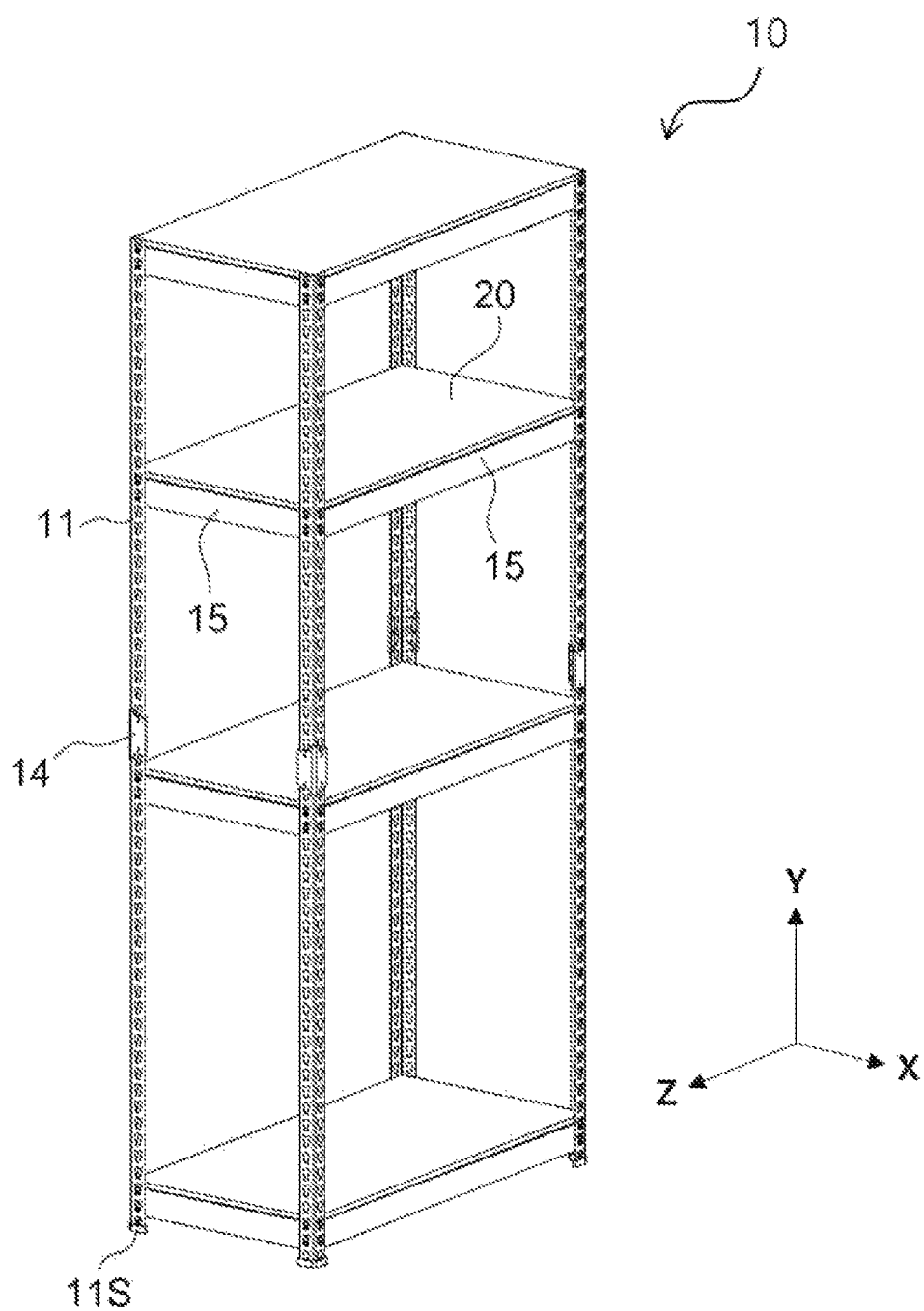
FIG. 1 is a view illustrating a configuration of a shelf that is assembled using an angle bar for shelf assembly according to a first embodiment of the present disclosure.

Embodiments of the present disclosure will be described in detail below with reference to the accompanying drawings.

The same numeral reference used in the accompanying drawings refers to members having the same or similar functions. The drawing is not scaled to a fixed scale. The thickness, the width, and the height of a constituent element on the drawings are disproportionately resized for convenience in understanding the present disclosure. The scope of the present disclosure should not be construed as being limited to this disproportionate resizing.

Figure 2:
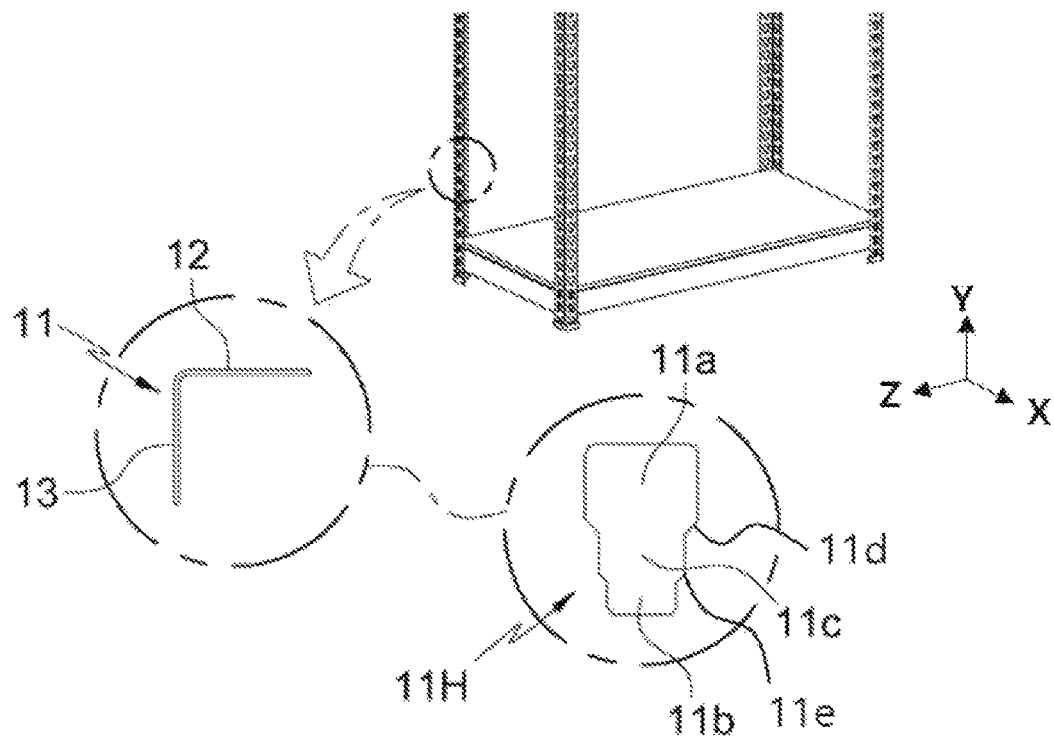
FIG. 2 is a view illustrating a structure of a vertical frame illustrated in FIG. 1.

FIG. 1 is a view illustrating a configuration of a shelf 10 that is assembled using an angle bar for shelf assembly according to a first embodiment of the present disclosure is used. FIG. 2 is a view illustrating a structure of a vertical frame 11 illustrated in FIG. 1. As illustrated, the assembly shelf 10 according to the present embodiment includes a vertical frame 11, a horizontal frame 15, and a support plate 20. The vertical frame 11 is configured to include two support plates 12 and 13 that are connected to each other at the respective side ends in the upright position in such a manner that the two support plates are perpendicular to each other. A plurality of fastening grooves 11H is formed in each of the two support plates 12 and 13.

The plurality of fastening grooves 11H may be formed in the support plates 12 and 13 in such a manner to be spaced apart the same distance and to be arranged in one or more rows along the lengthwise direction of the vertical frame 11 (or in the Y direction), so that an assembling height of the horizontal frame 15 can be adjusted. The plurality of fastening grooves 11H, each including an upper groove 11a, a middle groove 11c, and a lower groove 11b, are sequentially formed lengthwise. The middle groove 11c has a narrower width than the upper groove 11a. The middle groove 11c is connected to the upper groove 11a with an inclination portion 11d in between. The lower groove 11b has a narrower width than the middle groove 11c. The lower groove 11b is connected to the middle groove 11c with an inclination portion 11e in between.

A lower end portion of the vertical frame 11 is inserted into an accommodation groove in the shape of the Korean letter "ㄱ" that is formed in a support member 11S. The vertical frame 11, when standing in the vertical direction, serves as a pillar of the shelf 10.

There is provided a plurality of vertical frames 11, each of which is configured to include unit sub-frames, each with a predetermined length. With this configuration, an entire height of the shelf 10 can be changed. In this case, a bracket 14 is used to connect two or more vertical frames 11 to each other for extension.

Figure 3:
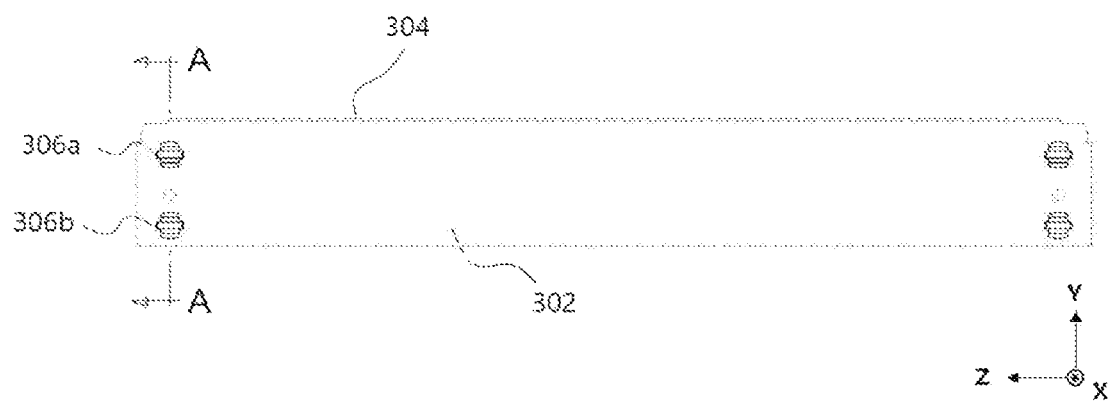
FIG. 3 is a view illustrating a structure of a horizontal frame illustrated in FIG. 1.
Figure 4:
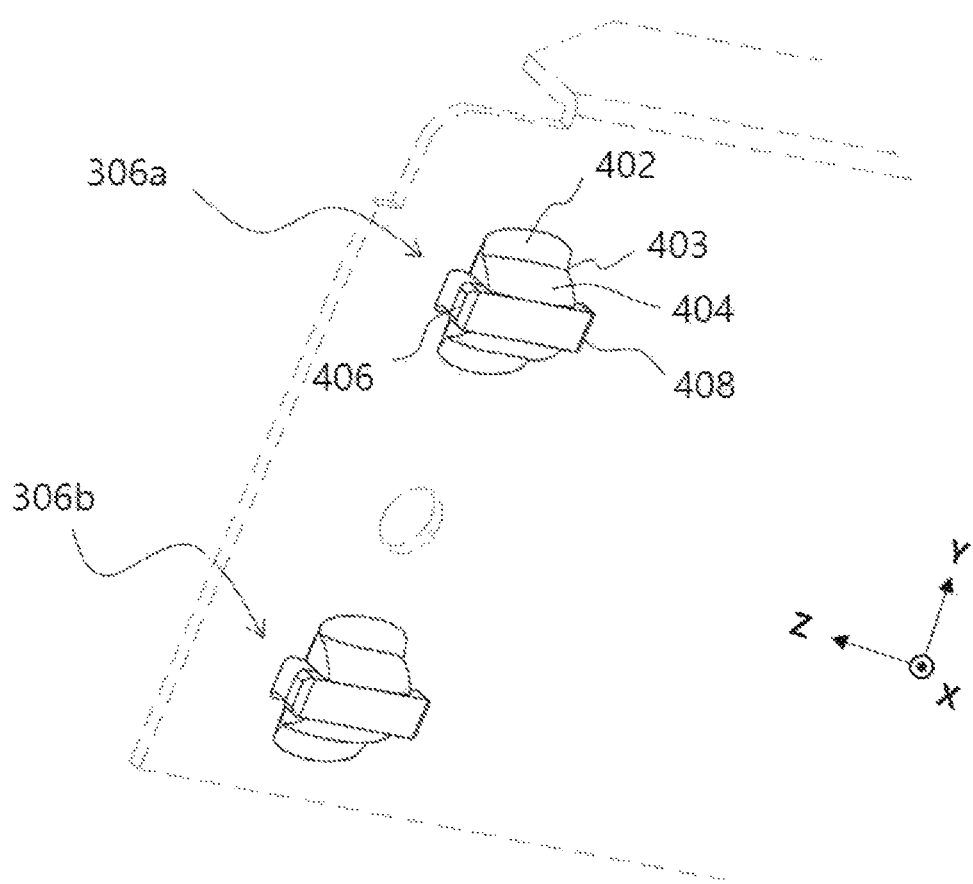
FIG. 4 is an enlarged view of fastening protrusions illustrated in FIG. 3.

FIG. 3 is a view illustrating a structure of the horizontal frame 15 illustrated in FIG. 1. As illustrated in FIG. 3, the horizontal frame 15 includes a connection portion 302, a support portion 304, and a fastening protrusion 306. FIG. 4 is an enlarged view of the fastening protrusions 306a and 306b illustrated in FIG. 3.

The support portion 304 extends approximately at a right angle from the connection portion 302 along the lengthwise direction thereof (along the Z direction) in a manner that has a predetermined width. The support portion 304 supports the support plate 20.

The fastening protrusions 306a and 306b are formed, in one row in the upward-downward direction, on an outer lateral surface of an end portion of the connection portion 302. A gab between the fastening protrusions 306a and 306b is the same as a gap between the two fastening grooves 11H formed in the vertical frame 11. The fastening protrusions 306a and 306b are formed on each of the outer lateral surfaces (or front surfaces) of first and second end portions of the connection portion 302 in such a manner as to protrude from each thereof. The protrusions 306 on first and second end portions of the horizontal frame 15 are positioned at the same heights as the fastening grooves 11H in the two vertical frames 11 that serve as the pillars of the shelf 10. The protrusion 306 is inserted into the fastening groove 11H for being combined therewith. The fastening protrusions 306a and 306b are inserted, from the inside of the vertical frame 11 to the outside thereof, into the fastening grooves 11H, respectively, for being fastened thereto, and thus a front surface of the horizontal frame 15 is brought into contact with a rear surface of the vertical frame 11. Therefore, convex portions of the vertical frame 11 and the horizon tonal frame 15, which serve to fasten the vertical frame 11 and the horizon tonal frame 15 to each other, are reduced in size. Thus, the vertical frame 11 and the horizon tonal frame 15 have an improved ornamental appearance.

As illustrated in FIG. 4, the fastening protrusion 306a includes convex portions 402 and 404 and wing portions 406 and 408. The convex portions 402 and 404 protrude in the thickness direction (the X direction) and have an inclination surface that is inclined widthwise in the upward-downward direction (the Y direction). The wing portions 406 and 408 are formed on lateral surfaces, respectively, of the convex portions 404 in such a manner as to protrude therefrom lengthwise in the leftward-rightward direction (the Z direction). An interface portion 403 is formed between the lower convex portion 402 and the upper convex portion 404 in such a manner that an inclination surface thereof is discontinuous at edges of inclination surfaces of the lower convex portion 402 and the upper convex portion 404.

Figure 5A:
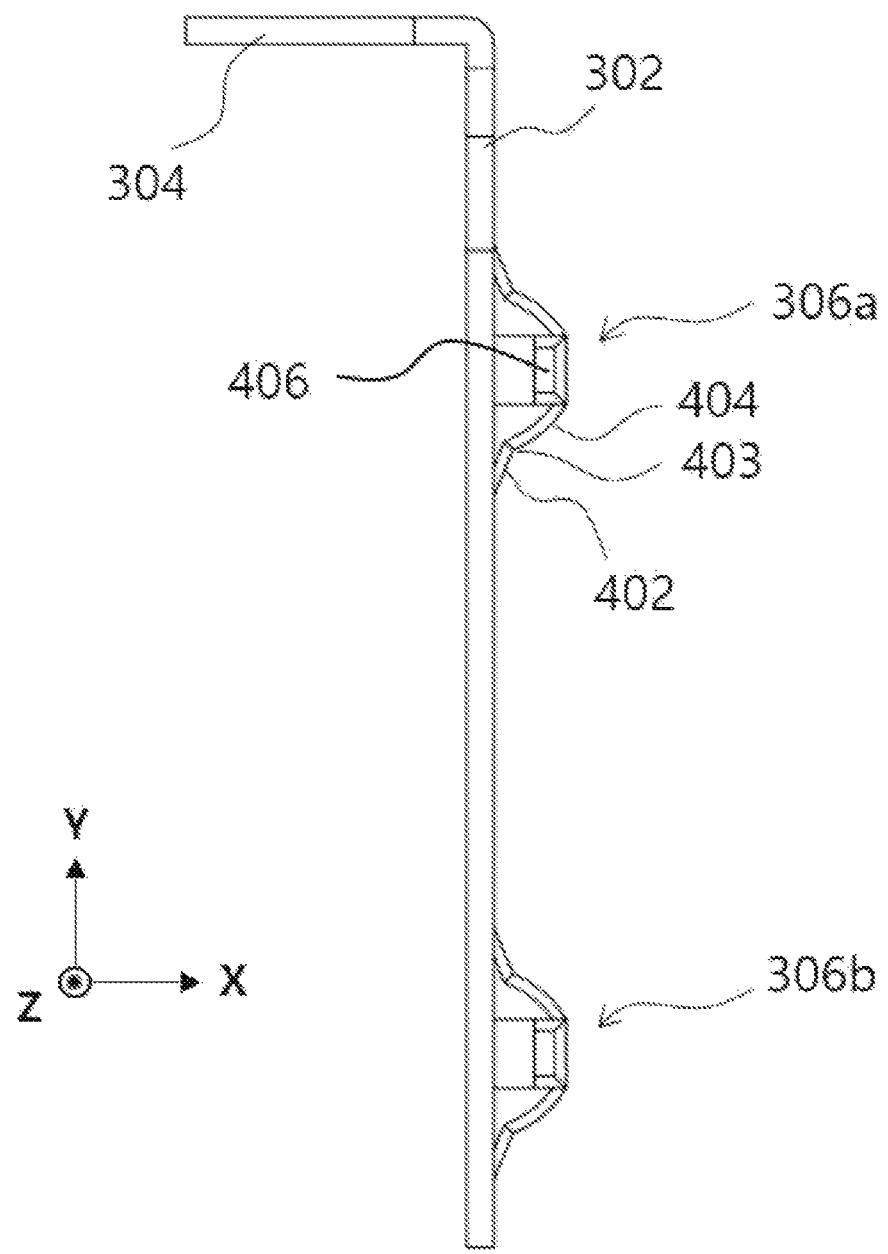
FIG. 5A is a side view of the horizontal frame illustrated in FIG. 3.
Figure 5B:
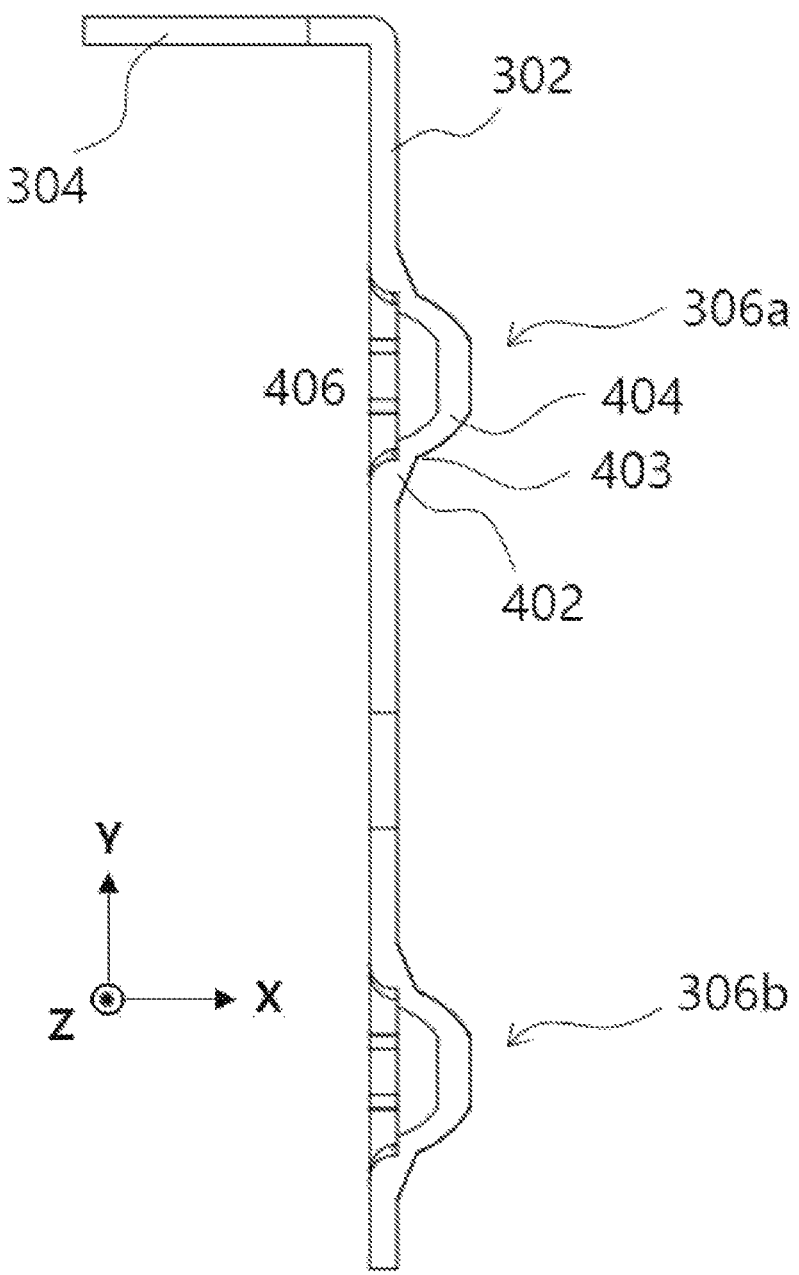
FIG. 5B is a vertical cross-section view taken along line A-A on FIG. 3.

FIG. 5A is a side view of the horizontal frame 15 illustrated in FIG. 3, and FIG. 5B is a vertical cross-section view taken along line A-A on FIG. 3. As illustrated, the support portion 304 is formed on the connection portion 302 in a manner that extends approximately at a right angle therefrom along the lengthwise direction thereof (along the Z direction) and that has a predetermined width. The fastening protrusions 306a and 306b are formed, in a row widthwise in the upward-downward direction (the Y direction), on an external surface (or a front surface) of each of the opposite end portions of the connection portion 302 in such a manner as to extend therefrom widthwise in the upward-downward direction (the X direction).

According to the present embodiment, the convex portions 402 and 404 on one side of each of the fastening protrusions 306a and 306b and the convex portions 402 and 404 on the other side thereof are symmetrical about the wing portions 406 and 408. The fastening protrusions 306a and 306b have this symmetrical shape only for the convenience of manufacturing and may have an asymmetrical shape. Parts of the convex portions 402 and 404 that are remote from the support portion 304 are forced to be inserted into the fastening groove 11H widthwise in the downward direction (the negative Y direction)

The interface portion 403 is formed between the convex portion 402 and the block portion 404. Therefore, the inclination surfaces formed widthwise in the upward-downward direction (the Y direction) of the convex portion 402 and the convex portion 404 are discontinuous. The lower convex portion 402 combined with the connection portion 302 has a gentler inclination surface widthwise in the upward-downward direction (the Y direction) than the convex portion 404 to which the wing portion 406 is attached. The convex portion 404 is inclined more steeply in the vicinity of the interface portion 403 than the lower convex portion 402.

Figure 6A:
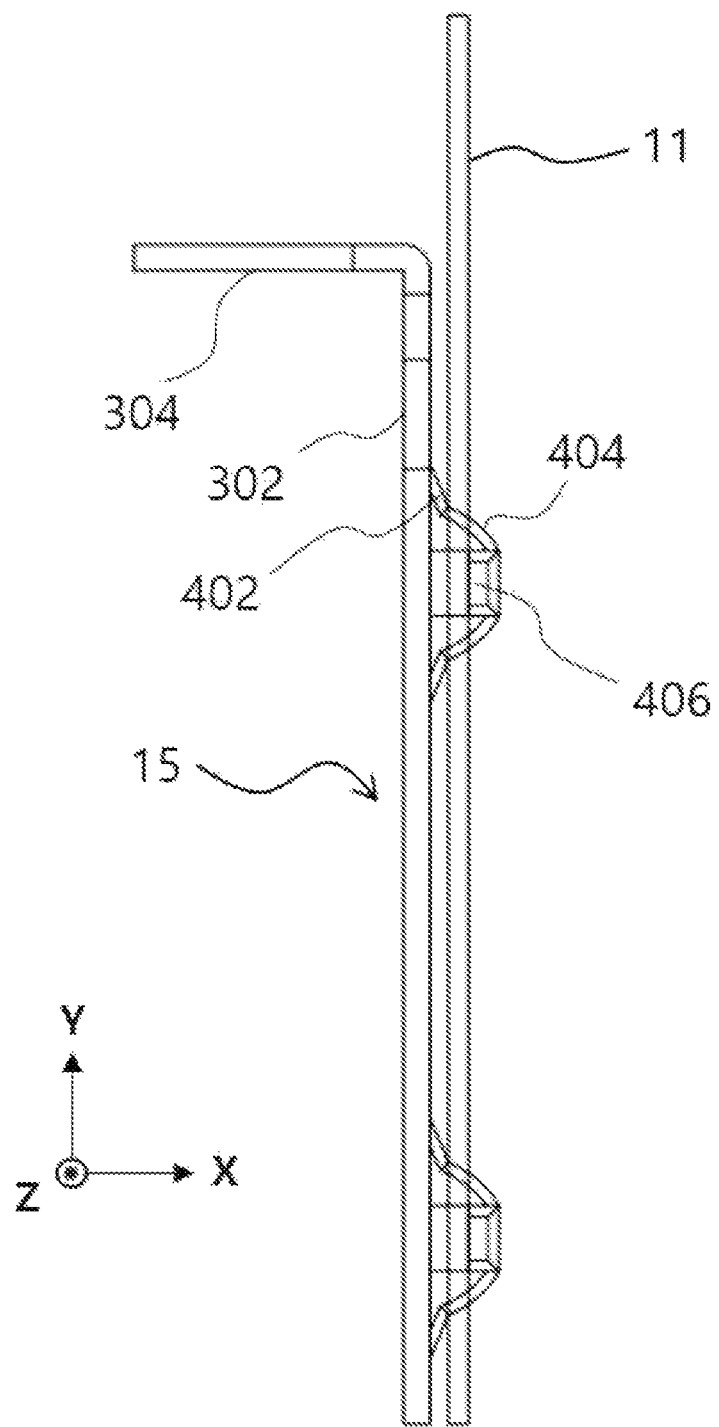
FIG. 6A is a side view illustrating the horizontal frame and the vertical frame combined with the horizontal frame illustrated in FIG. 3.
Figure 6B:
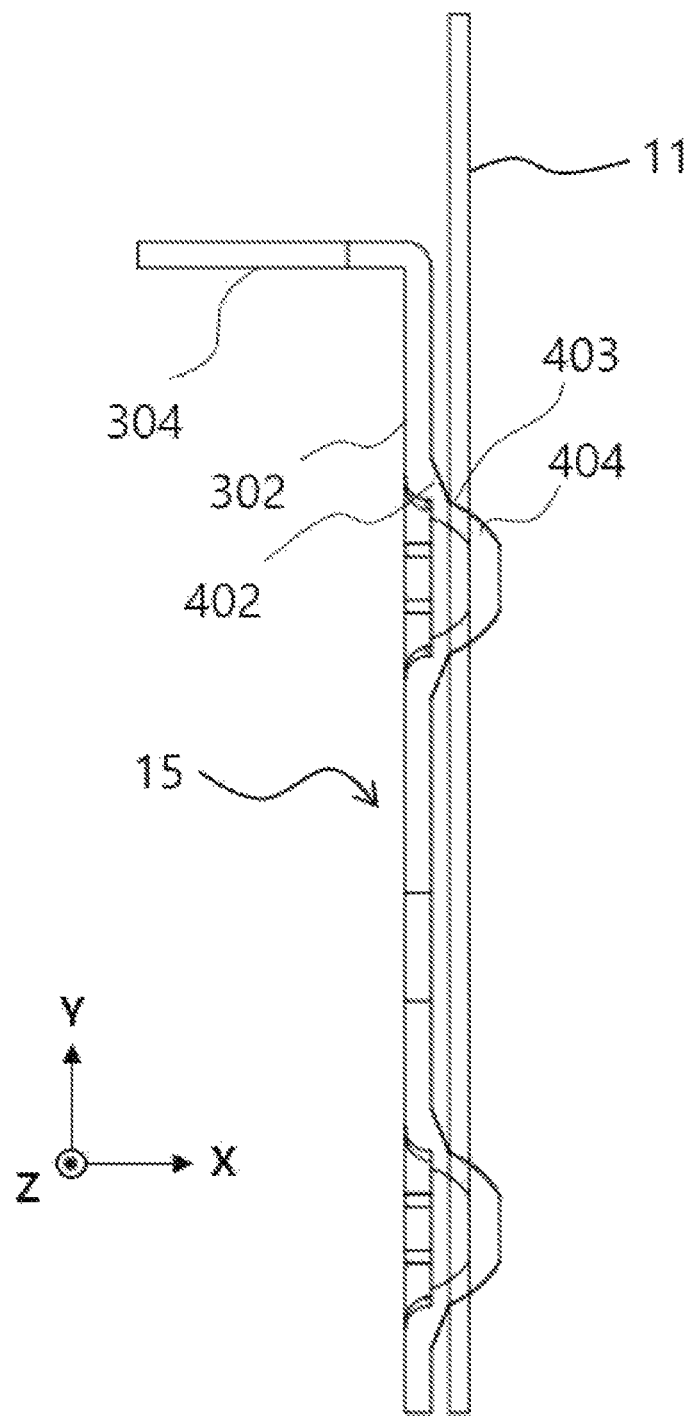
FIG. 6B is a vertical cross-sectional view taken along line A-A on FIG. 3.
Figure 7:
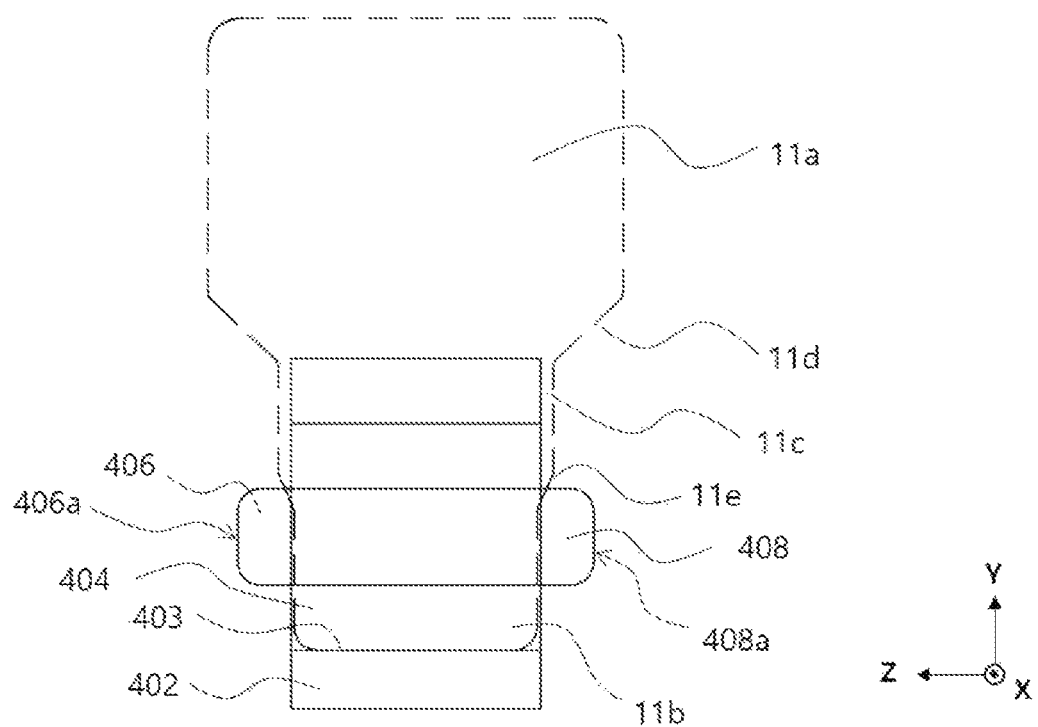
FIG. 7 is a view illustrating a state where the fastening protrusion on the horizontal frame is inserted into a fastening groove in the vertical frame from being combined therewith in the angle bar for shelf assembly illustrated in FIG. 1.

FIG. 6A is a side view illustrating the horizontal frame 15 and the vertical frame 11 combined with the horizontal frame illustrated in FIG. 3. FIG. 6B is a vertical cross-sectional view taken along line A-A on FIG. 3. FIG. 7 is a view illustrating a state where the fastening protrusion 306a on the horizontal frame 15 is inserted into the fastening groove 11H in the vertical frame 11 for being combined therewith in the angle bar for shelf assembly illustrated in FIG. 1.

A distance between an end portion 406a of the wing portion 406 and an end portion 408a of the wing portion 408 is smaller than a width in the leftward-rightward direction of the upper groove 11a and is larger than a width in the leftward-rightward direction of the middle groove 11c. Therefore, during shelf assembling, the fastening protrusion 306a is pushed from the inside (or the rear surface) of the vertical frame 11 to the outside (or the front surface) thereof for being inserted into the upper groove 11a. When the fastening protrusion 306a moves downward (in the negative Y direction), this movement is guided by the inclination portion 11d, and thus, the fastening protrusion 306a is positioned in the middle groove 11c. When the fastening protrusion 306a is positioned in the middle groove 11c, the wing portions 406 and 408 are positioned outside the vertical frame 11, and the connection portion 302 is positioned inside the vertical frame 11. Therefore, the horizontal frame 15 is held to some extent.

A width in the leftward-rightward direction of the middle groove 11c is smaller than a distance between the end portions 406a and 408a of the wing portions 406 and 408 and is somewhat larger than widths in the leftward-rightward direction of the convex portions 402 and 404. Therefore, the horizontal frame 15 is also held to some extent lengthwise (in the Z direction).

The convex portions 402 and 404 are formed in such a manner as to have a narrower width in the leftward-rightward direction than the middle groove 11c and to have the wider width in the leftward-rightward direction than the lower groove 11b. For this reason, the fastening protrusion 306a can be positioned in the middle groove 11c. In this state, when the horizontal frame 15 is pressed downward (in the negative Y direction), the lower convex portion 402 of the fastening protrusion 306a is guided by the inclination portion 11e, and the vertical frame 11 made of iron is elastically deformed. Thus, the convex portions 402 and 404 are forced to be inserted into the lower groove 11b.

The lower convex portion 402 has a gentle inclination surface and thus can be inserted, with less force, into the lower groove 11b. Therefore, for assembling, the lower convex portion 402 does not need to be hit by a hammer or the like and thus, less sound is produced. The interface portion 403 is formed between the lower convex portion 402 and the upper convex portion 404. Therefore, when the interface portion 403 reaches a lower edge of the lower groove 11b, more force is required for forced insertion. To this end, the fastening protrusion 306a can be forced to be inserted to reach a predetermined position in the lengthwise direction of the vertical frame 11 (the Y direction). Thus, the precision of assembling can be increased.

As illustrated in FIG. 6, when the interface portion 403 reaches an end portion (or the lower edge) of the lower groove 11b, the lower convex portion 402 presses against the rear surface (or the inside) of the vertical frame 11. The wing portions 406 and 408 are positioned on the front (or the outside) of the vertical frame 11. Therefore, the vertical frame 11 is forced to be inserted between each of the wing portions 406 and 408 and the lower convex portion 402. Thus, the horizontal frame 15 is securely held at a predetermined position in the thickness direction (the X direction) with respect to the vertical frame 11.

In a case where the lower convex portion 404 is arc-shaped widthwise in the upward-downward direction, an inclination surface of the lower convex portion 404 is gently inclined in the vicinity of the interface portion 403 and thus presses against the rear surface (or the inside) of the vertical frame 11 in a more stable manner.

When the convex portions 402 and 404 are forced to be inserted into the lower groove 11b of the fastening groove 11H, opposite lateral surfaces of the upper convex portion 404 are brought into very close contact with opposite lateral surfaces, respectively, of the lower groove 11b. Accordingly, the horizontal frame 15 is securely held at a predetermined position lengthwise (the Z direction) with respect to the vertical frame 11. The surface contact between the lower convex portion 404 and the lower groove 11b also securely holds the horizontal frame 15 widthwise (the Y direction) with respect to the vertical frame 11.

Figure 8:
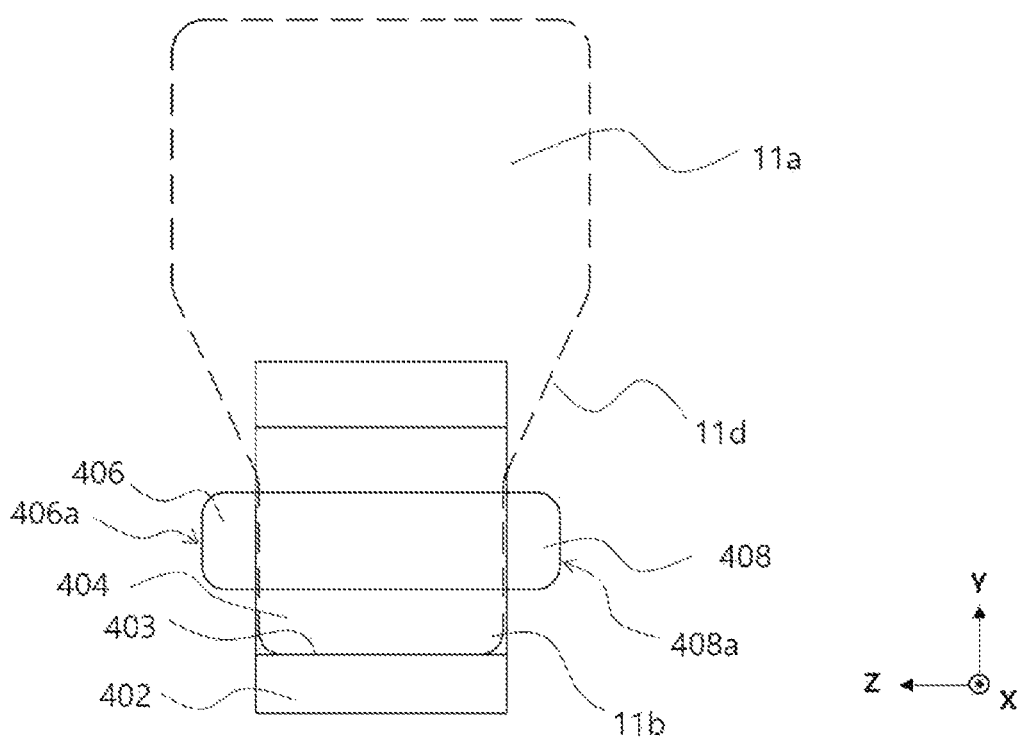
FIG. 8 is a view illustrating a state where the fastening protrusion on the horizontal frame is inserted into the fastening groove for being combined therewith in the vertical frame for being combined therewith in an angle bar for shelf assembly according to a second embodiment of the present disclosure.

FIG. 8 is a view illustrating a state where the fastening protrusion 306a on the horizontal frame 15 is inserted into the fastening groove 11H in the vertical frame 11 for being combined therewith in an angle bar for shelf assembly according to a second embodiment of the present disclosure. As illustrated in FIG. 8, the plurality of fastening grooves 11H, each including the upper groove 11a and the lower groove 11b, may be sequentially formed lengthwise. In this case, the lower groove 11b has a narrower width than the upper groove 11a and is connected to the upper groove 11a with the inclination portion 11d in between. Other constituent elements and functions thereof are the same as those according to the angle bar for shelf assembly according to the first embodiment.

The embodiments of the present disclosure are described above to assist a person of ordinary skill in the art in understanding the present disclosure and are not intended to impose any limitation on the claimed scope of the present disclosure. Therefore, it should be noted that it would be apparent to a person of ordinary skill in the art that various modifications and alterations are possibly made to the above-described embodiments of the present disclosure without departing from the claimed scope of the present disclosure.

What is claimed is:

1. An angle bar for shelf assembly, the angle bar including a vertical frame in which a plurality of fastening grooves is formed lengthwise and a horizontal frame on which a fastening protrusion to be inserted into a corresponding fastening groove from said plurality of fastening grooves is formed, wherein the plurality of fastening grooves each include an upper groove and a lower groove that are sequentially formed lengthwise, the lower groove has a narrower width than the upper groove, and is connected to the upper groove with an inclination portion in between, wherein the fastening protrusion includes a convex portion having an inclination surface widthwise in an upward-downward direction, a first wing portion, a second wing portion, and a median portion that extends between and connects the first wing portion and the second wing portion, wherein the first wing portion and the second wing portion are directly attached to the horizontal frame and are generally perpendicular to the horizontal frame, wherein the first wing portion, the second wing portion, and the median portion surround the convex portion, and wherein a distance between an end portion of the first wing portion and an end portion of the second wing portion is smaller than a width in a leftward-rightward direction of the upper groove and is larger than a width in the leftward-right direction of the lower groove, and the convex portion has a wider width in the leftward-rightward direction than the lower groove in such a manner as to be forced to be inserted into the lower groove.

2. An angle bar for shelf assembly, the angle bar including a vertical frame in which a plurality of fastening grooves is formed lengthwise and a horizontal frame on which a fastening protrusion is inserted into a corresponding fastening groove from said plurality of fastening grooves is formed, wherein the plurality of fastening grooves each include an upper groove, a middle groove, and a lower groove that are sequentially formed lengthwise, the middle groove has a narrower width than the upper groove and is connected to the upper groove with an inclination portion in between, and the lower groove has a narrower width than the middle groove and is connected to the middle groove with the inclination in between, wherein the fastening protrusion includes a convex portion having an inclination surface widthwise in an upward-downward direction a first wing portion, a second wing portion, and a median portion that extends between and connects the first wing portion and the second wing portion, wherein the first wing portion and the second wing portion are directly attached to the horizontal frame and are generally perpendicular to the horizontal frame, wherein the first wing portion, the second wing portion, and the median portion surround the convex portion, and wherein a distance between an end portion of the first wing portion and an end portion of the second wing portion is smaller than a width in a leftward-rightward direction of the upper groove and is larger than a width in the leftward-right direction of the lower groove, and the convex portion has a narrower width in the leftward-rightward direction than the middle groove and has the wider width than the lower groove in such a manner as to be forced to be inserted into the lower groove.

3. The angle bar of claim 1, wherein the convex portion of the fastening protrusion comprises an upper convex portion and a lower convex portion with an interface portion in between, and wherein the upper convex portion is inclined more steeply in a vicinity of the interface portion than the lower convex portion.

4. The angle bar of claim 2, wherein the convex portion of the fastening protrusion comprises an upper convex portion and a lower convex portion with an interface portion in between, and wherein the upper convex portion is inclined more steeply in a vicinity of the interface portion than the lower convex portion.

5. The angle bar of claim 3, wherein the fastening protrusion is inserted into the fastening groove for being fastened thereto, in such a manner that the interface portion reaches an end portion of the lower groove, and wherein the lower convex portion is configured to be presses against a rear surface of the vertical frame.

6. The angle bar of claim 4, wherein the fastening protrusion is inserted into the fastening groove for being fastened thereto, in such a manner that the interface portion reaches an end portion of the lower groove, and wherein the lower convex portion is configured to be presses against a rear surface of the vertical frame.

7. The angle bar of claim 3, wherein the interface portion is formed on the convex portion in such a manner that the vertical frame is inserted between the wing portion and the interface portion.

8. The angle bar of claim 4, wherein the interface portion is formed on the convex portion in such a manner that the vertical frame is inserted between the wing portion and the interface portion.

9. The angle bar of claim 3, wherein the lower convex portion is arc-shaped widthwise in the upward-downward direction.

10. The angle bar of claim 4, wherein the lower convex portion is arc-shaped widthwise in the upward-downward direction.

* * * * *